(12) United States Patent
Evans et al.

(10) Patent No.: US 7,190,637 B2
(45) Date of Patent: Mar. 13, 2007

(54) GUIDED UNDERWATER OBJECT

(75) Inventors: Benjamin Scott Evans, Weymouth (GB); Richard John Gibson, Weymouth (GB)

(73) Assignee: Qinetiq Limited (GB)

( * ) Notice: Subject to any disclaimer, the term of this patent is extended or adjusted under 35 U.S.C. 154(b) by 158 days.

(21) Appl. No.: 10/938,415

(22) Filed: Sep. 10, 2004

(65) Prior Publication Data

US 2005/0099890 A1 May 12, 2005

(30) Foreign Application Priority Data

Sep. 10, 2003 (GB) ................. 0321121.6

(51) Int. Cl.
*G01S 1/76* (2006.01)
*G05D 1/10* (2006.01)

(52) U.S. Cl. ...................... 367/133; 367/138

(58) Field of Classification Search ............... 367/133, 367/138
See application file for complete search history.

(56) References Cited

U.S. PATENT DOCUMENTS

| | | | |
|---|---|---|---|
| 3,723,957 A | | 3/1973 | Damon |
| 4,372,239 A | * | 2/1983 | Hagelberg et al. .......... 367/133 |
| 5,436,874 A | * | 7/1995 | Kuhn et al. .................. 367/176 |
| 6,802,236 B1 | * | 10/2004 | Richardson ................... 89/1.13 |

FOREIGN PATENT DOCUMENTS

| | | |
|---|---|---|
| GB | 2279529 | 1/1995 |
| JP | 57-000714 | 1/1982 |

OTHER PUBLICATIONS

Search Report from UK Patent Office of Application No. GB 03211216.6.

* cited by examiner

*Primary Examiner*—Ian J. Lobo
(74) *Attorney, Agent, or Firm*—McDonnell Boehnen Hulbert & Berhgoff LLP

(57) ABSTRACT

A guided underwater object (GUO) (100) comprises steering means, an on-board guidance system (200) for controlling the steering means, and a hydrophone unit or units (104A, 104B, 104C, 104D, 104E, 104F, 104G, 104H) arranged to pass signals induced therein by an acoustic guiding beam to the on-board guidance system to effect directional control of the self-propelled underwater object. The GUO is guided by a remote guidance system characterized by a plurality of transmitter arrays (402A, 402B, 402C, 402D; 412A, 412B, 412C, 412D; 422P, 422Q, 422R) arranged to transmit a plurality of contiguous acoustic beams (302A, 302B, 302C, 302D) each having a different frequency or frequency chirp (or other acoustic signal coding) and enclosing a guidance corridor of lower sound level ('null') (304) extending approximately in the direction of propagation of the acoustic beams and defining a flight path of the object. The GUO requires no on-board search sensors, no communications link with the guidance system and is of low cost.

10 Claims, 7 Drawing Sheets

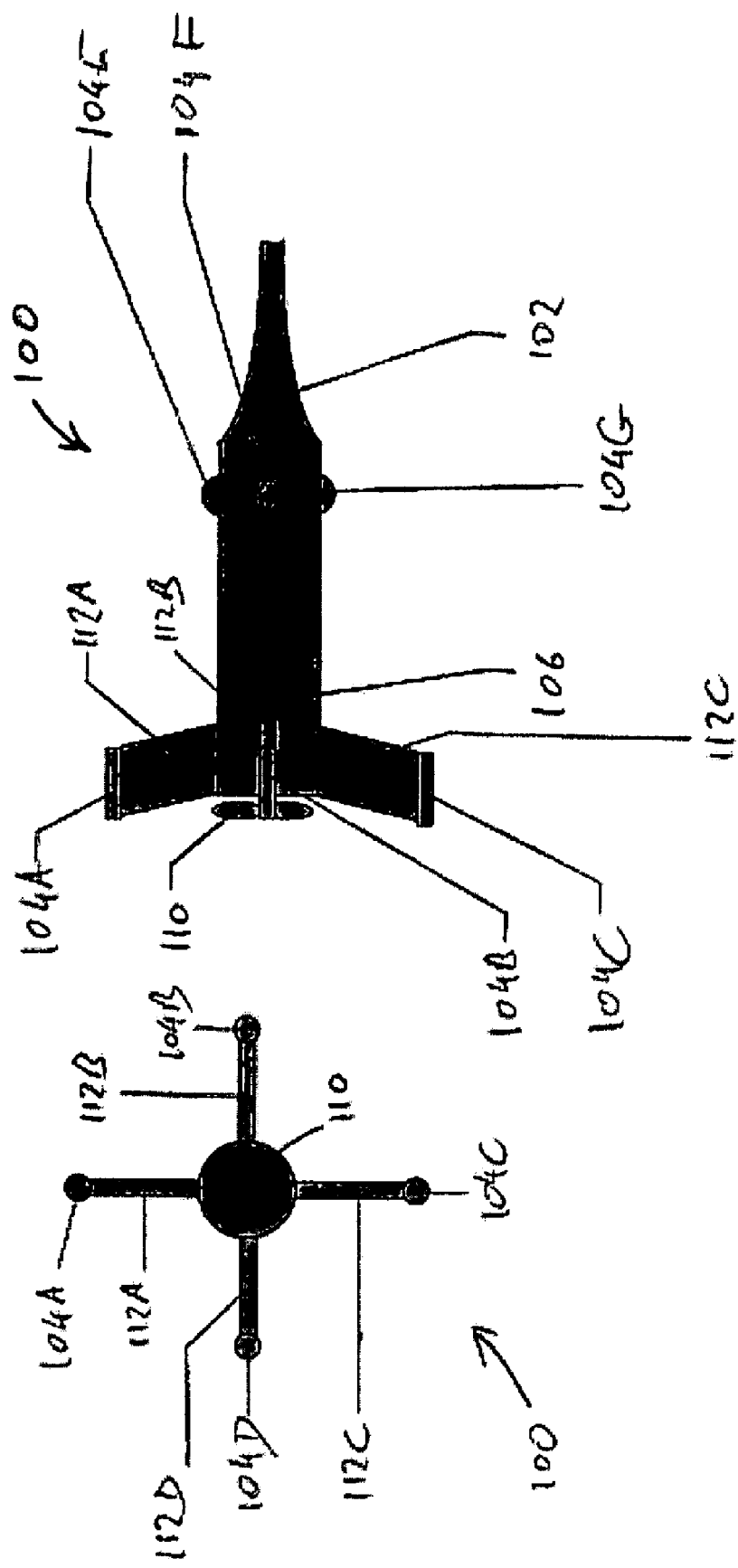

GUIDED UNDERWATER OBJECT

BACKGROUND OF THE INVENTION (1) Field of the Invention

The invention relates to guided underwater objects (GUOs), particularly (although not exclusively) unmanned, self-propelled, underwater objects, which are useful for performing tasks such as carrying out underwater surveys and conveying equipment or other payloads.

(2) Description of Related Art

Current technology includes ROVs and UUVs for civilian offshore survey and intervention tasks, as well as UUVs such as the RCMDS2.

Common features of known GUO-systems are:
(a) Acoustic tracking systems are used to measure position and movement and enable a vehicle operator to maintain positional control of the GUO;
(b) Onboard sensors (e.g. sonar/camera) used for GUO control during final approach and during intervention type operations;
(c) Fibre-optic or copper umbilicals used for transmitting sensor data back to an operator and control signals to the GUO system.

There are several limitations resulting from the known systems, viz:
(a) the inclusion of fibre-optic/copper communications links, sonars, cameras and acoustic tracking transponders result in complex and expensive systems. In applications where (for one shot systems) the vehicle is not recovered at the end of an operation this enhanced level of cost is undesirable.
(b) the update rate of the tracking system is limited by the speed of sound in water, with the resulting time delay in obtaining an accurate measurement effectively limiting the maximum safe movement speed of the GUO and the rate at which its positional control loop can be updated. This is turn reduces the ability of the GUO to operate effectively in higher currents and levels of turbulence.
(c) Umbilicals deployed from GUOs are prone to entanglement, whilst disposable fibres used on some GUO systems can result in large lengths of fibre-optic cable being left in the sea at the end of a mission, which is not environmentally acceptable.

BRIEF SUMMARY OF THE INVENTION

It is an object of the invention to ameliorate these problems, and according to the invention, this object is achieved by a guided underwater object (GUO) comprising steering means and an on-board guidance system for controlling the steering means, characterised in that the GUO further comprises a hydrophone unit arranged to pass signals induced therein by an acoustic guiding beam to the on-board guidance system to effect directional control of the guided underwater object.

The invention provides for a GUO, the direction of which can be updated at a high rate, acoustically guided by a remote guidance system mounted either in a fixed position or alternatively on a stand-off vessel or 'mother' underwater system.

Directional control of the GUO is achieved entirely by the on-board guidance system having control loops which can operate at a high update-rate, thus enabling high SPUO movement rates to be employed.

An GUO of the invention provides the following advantages:
(a) no on-board search sensors are required;
(b) no communications link is required between the GUO and the mother vessel/underwater system;
(c) the GUO can manoeuvre at high speeds due to a self contained high-rate control system (speeds of 20 kt+ are achievable) giving, inter alia, substantial immunity to sea-currents;
(d) the GUO can be very simple and very low cost.

Furthermore, the residual environmental problem is removed since there is no optical fibre left in the water.

Enhanced control of the GUO may be achieved if it comprises a plurality of hydrophone units each arranged to pass signals induced therein by an acoustic guiding beam to the on-board guidance system to effect directional control of the GUO, and the on-board guidance system is arranged to distinguish signals induced by acoustic guidance beams having differing acoustic signal coding (for example different frequencies or frequency-chirps).

In order to reduce noise in signals generated by the hydrophone units, each may comprise an individual hydrophone within an acoustically absorbing casing which is open at an end facing towards the rear of the GUO. Such noise may be reduced further by providing each hydrophone unit with a hydrodynamic fairing to prevent separation of fluid flow over the unit, and/or by positioning the units so that they are not affected by any wake produced by the GUO when it is in motion.

GUOs of the invention may be guided by a remote guidance system having a plurality of transmitter arrays arranged to transmit a plurality of contiguous acoustic beams, each having a different acoustic signal coding (for example a different frequency or frequency chirp) and enclosing a guidance corridor of lower sound level (herein referred to as a 'null') extending approximately in the direction of propagation of the acoustic beams and defining a flight path of the object. Two-dimensional transmitter arrays of individual transmitting elements may be used to generate conical acoustic beams, however beams of other shapes (for example beams generated by line arrays) may also be used.

The remote guidance system may comprise a search sonar to enable an GUO of the invention to be directed to, or towards, a distant object.

Embodiments of the invention are described below by way of example only and with reference to the accompanying drawings in which:

BRIEF DESCRIPTION OF THE SEVERAL VIEWS OF THE DRAWINGS

FIG. 1 shows a side view of GUO of the invention;

FIG. 2 shows an end view of the FIG. 1 GUO;

DETAILED DESCRIPTION OF PREFERRED EMBODIMENTS OF THE INVENTION

Figure 3:
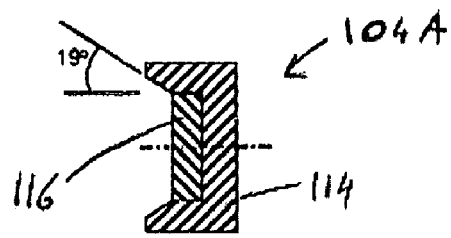
FIG. 3 illustrates the construction of a hydrophone unit comprised in the FIG. 1 GUO.

Referring to FIGS. 1 and 2, a GUO of the invention, indicated generally by 100, comprises front 102 and rear 106 portions. The rear portion 106 has four stabilising/guidance fins 112A, 112B, 112C, 112D. The GUO 100 has a screw propeller 110 (i.e. the GUO 100 is a self-propelled, guided underwater object), however any propulsion system suitable for underwater vehicles could be substituted for this. Hydrophone units 104A, 104B, 104C, 104D are mounted on fins 112A, 112B, 112C, 112D respectively. Secondary hydrophone units 104E, 104F, 104G and 104H (not shown) are mounted on the front portion 102 of the GUO 100. The GUO 100 further comprises steering means (e.g. elevators and rudders or vectored thrust (not shown)), which is under the control of an on-board guidance system (not shown). The on-board guidance system is arranged to receive signals from the hydrophone units 104A, 104B, 104C, 104D, and to output control signals to the steering means so that, in use, the SPUO 100, follows a desired path.

FIG. 3 shows a cross section of hydrophone unit 104A. Hydrophone units 104B, 104C, 104D, 104E, 104F, 104G, 104H have the same construction. The hydrophone unit 104A comprises a 6 mm-diameter hydrophone within an acoustically absorbing casing 114 which is open at one end, defining an open portion thereof. Each hydrophone unit 104A, 104B, 104C, 104D 104E, 104F, 104G, 104H is mounted on the GUO 100 so that it is backwards-facing (i.e. the open portions of the casings are backwards-facing) and located on the GUO 100 so as to be largely unaffected by any wake produced by the GUO 100 when it is in use. Hydrodynamic fairings may be provided for the hydrophone units 104B, 104C, 104D, 104E, 104F, 104G, 104H, if necessary, to prevent separation of flow over them, or to reduce other flow noise.

Figure 4:
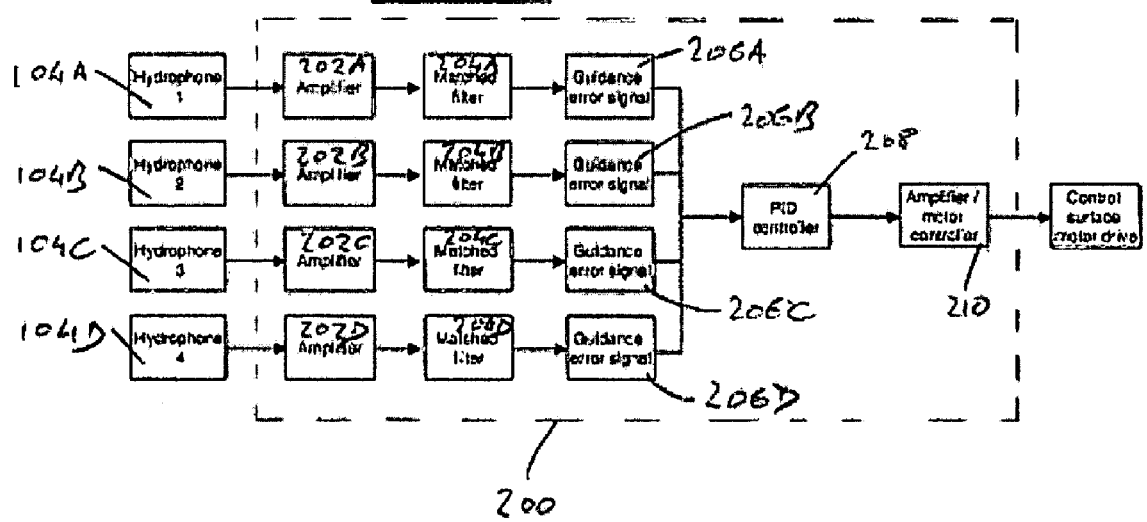
FIG. 4 schematically illustrates an on-board guidance system of the FIG. 1 GUO.

FIG. 4 shows a schematic diagram of the on-board guidance system of the GUO 100, the system being indicated generally by 200. Signals from hydrophone unit 104A are amplified and passed to a matched filter 204A which decodes the signals to identify the position of the GUO 100 relative to acoustic guidance beams transmitted by a remote guidance system on the basis of amplitude and/or phase and/or signal code information in the beams. Signals from hydrophone units 104B, 104C, 104D are processed likewise. Guidance error signals 206A, 206B, 206C, 206D (corresponding to hydrophone units 104A, 104B, 104C, 104D respectively) are output from the matched filters 204A, 204B, 204C, 204D and are passed to a PID controller 208 which generates control signals for the steering means to direct the GUO 100 in a direction which minimises the overall error. The remote guidance system 200 has an update rate of 20 to 30 Hz.

Figure 5:
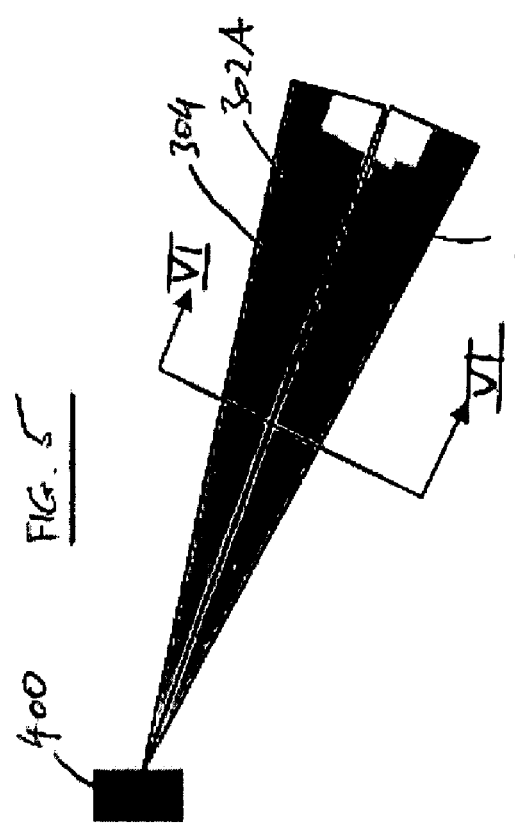
FIGS. 5 and 6 illustrate a directional control scheme for the FIG. 1 GUO.
Figure 6:
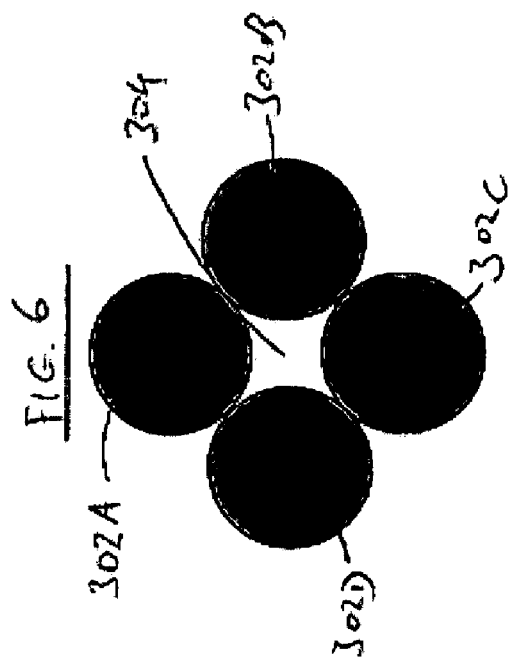

FIGS. 5 and 6 illustrate a guiding scheme for the GUO 100. A remote guidance system 400, which may be in a fixed position or alternatively mounted on a 'mother' vessel, emits four contiguous conical acoustic beams 302A, 302B, 302C, 302D defining a null 304 which is the desired path of the GUO 100. FIG. 6 shows a cross-section through the acoustic beams 302A, 302B, 302C, 302D through section VI—VI in FIG. 5. When the GUO 100 is in motion under control of the remote guidance system 400 it is controlled to move within the null 304 between the acoustic beams 302A, B, C, D. If the GUO 100 deviates from the desired path defined by the null 304, one or more of the hydrophones 104A, 104B, 104C, 104D detects one or more the acoustic beams 302A, 302B, 302C, 302D; the on-board guidance system 200 then adjusts the steering means so that the GUO 100 remains travelling within the null 304.

As the GUO 100 travels away from the remote guidance system 400, the acoustic beams 302A, 302B, 302C, 302D are adjusted independently (if required) to ensure that the null remains at the required size to ensure accurate positional control of the GUO 100 despite the diameter of the acoustic beams 302A, 302B, 302C, 302D increasing with distance from the remote guiding system 400, or the beams can be set initially to provide the required size of guidance 'null' over the full range of operation, thus removing any need for the beams to be moved relative to one-another.

Each of the acoustic beams 302A, 302B, 302C, 302D is coded in a unique way, each having a different frequency or frequency-chirp, so that a signal induced in a hydrophone mounted on the GUO 100 corresponds to a particular acoustic beam. The unique coding provides the on-board guidance system 200 with positional information needed to maintain the desired flight path 304.

Figure 7:
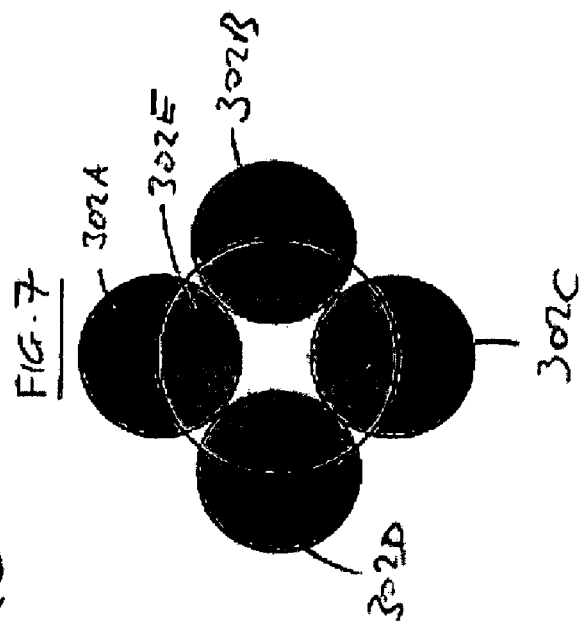
FIG. 7 illustrates a scheme for providing additional control of the FIG. 1 GUO.

FIG. 7 shows how a fifth acoustic beam 302E may be propagated within the null 304. The beam 302E may be used intermittently to effect some kind of non-directional control of the GUO 100. For example, the GUO 100 may be designed to collect or release a payload of some kind on reception of the beam 302E. Where the GUO 100 is required to carry out surveying operations, the acoustic beam 302E may be used to start and stop operation of on-board surveying equipment, such as sonar, cameras etc.

Figure 8:
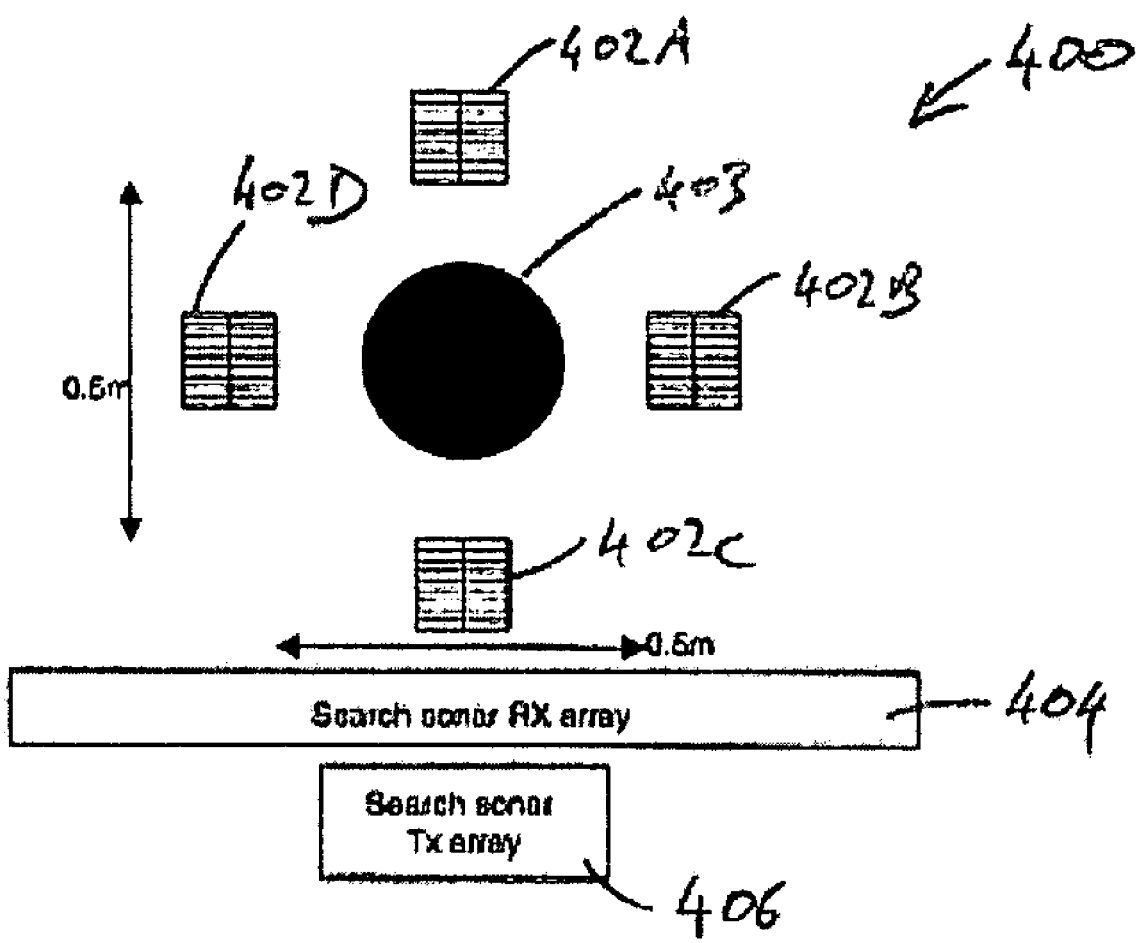
FIG. 8 shows a remote guidance system of the invention.

FIG. 8 shows the remote guidance system 400 for the GUO 100. The system 400 produces the four conical acoustic guiding beams 302A, 302B, 302C, 302D shown in FIGS. 5 and 6, and comprises four transmitter arrays 402A, 402B, 402C, 402D for transmitting the acoustic beams 302A, 302B, 302C, 302D respectively. Each transmitter array 402A, 402B, 402C, 402D operates in the frequency range 300 to 360 kHz, as this frequency range provides a useful trade-off in range and transmitter size. (However other frequencies in the range 160–400 kHz may be utilised to improve the range of the system 400 or to reduce its size.) Specific frequencies of the transmitter arrays 402A, 402B, 402C, 402D are as follows:

402A—300 KHz; 402C—320 kHz; 402B—340 kHz; 402D—360 kHz.

Each transmitter array 402A, 402B, 402C, 402D measures approximately (63 mm by 63 mm) and is made up of a 9×2 array of individually powered elements to enable the acoustic beams to be electronically steered. The use of 9 elements in the vertical allows the acoustic beams to be steered through ±12° (matching the vertical aperture of potential search sonar systems mounted on the mother vessel or underwater system). The use of two elements in the horizontal allows the acoustic beams to be steered through ±3.5°. In FIG. 8, 403 indicates the launch position of the GUO 100.

The remote guidance system 400 employs standard sonar transmitter technology known to those skilled in the art of sonar engineering, e.g. 1:3 composite arrays, and includes waveform-generation and amplification electronics. The vertical 402A, 402B, and the horizontal 402C, 402D arrays, are displaced from each other by a distance of 0.5 m. The arrays 402A, 402B, 402C, 402D each have an angular offset of 1.72° so that edges of the acoustic beams 304A, 304B, 304C, 304D are parallel to the desired path of the GUO 100.

An alternative frequency scheme uses a single frequency for each transmitter array and provides a different signal coding for each of the acoustic beams.

The remote guidance system 400 further comprises transmission 406 and reception 404 search sonar devices for locating an object towards which, or to which, the GUO 100 is to be directed.

Figure 9:
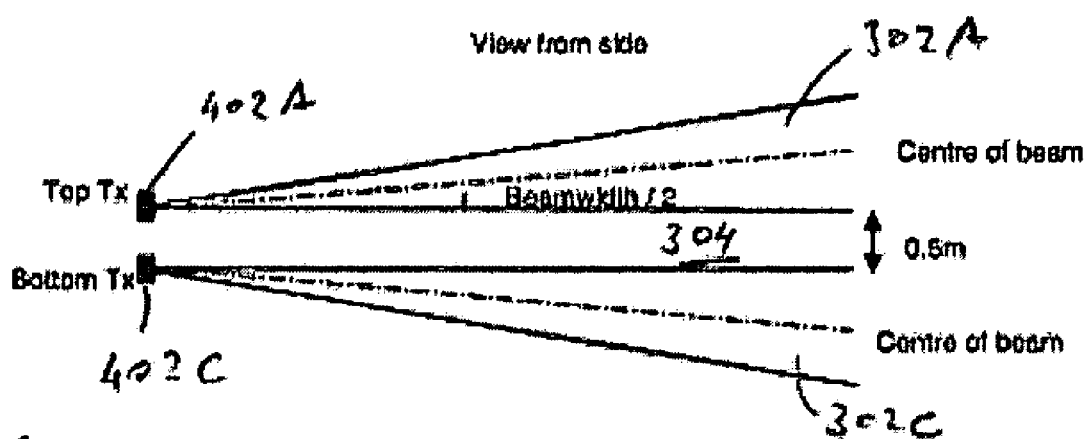
FIGS. 9 and 10 show vertical and horizontal sections respectively through acoustic beams transmitted by the FIG. 8 system.
Figure 10:
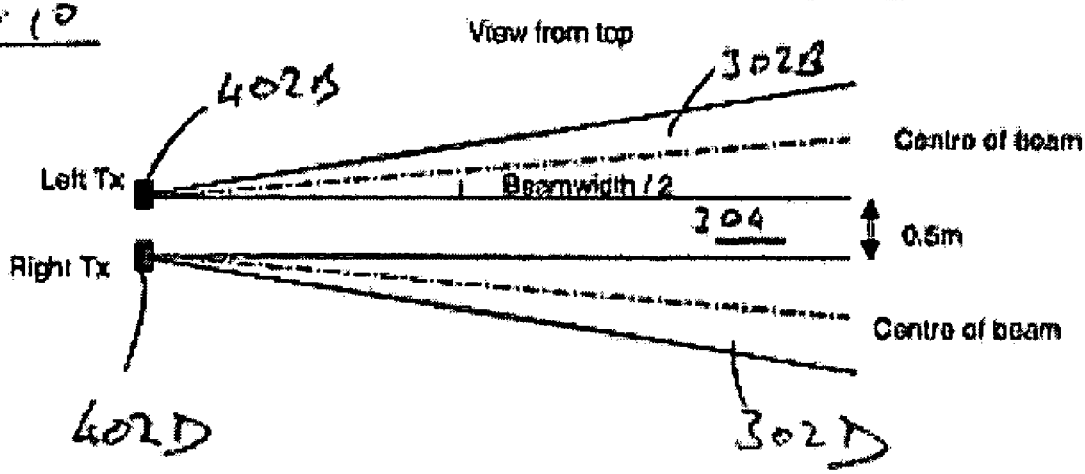

FIGS. 9 and 10 show vertical and horizontal sections through the acoustic beams transmitted by the system 400. Each beam has an angular width of approximately 3.4° which is suitable for controlling the SPUO 100 up to a range of approximately 600 m. The use of multiple transmitter elements and electronic beam steering techniques enables the position of the 'null' to be altered by +/−12 degrees in the vertical and +/−3.5 degrees in the horizontal without any physical movement of the guidance system. Movement of the guidance 'null' outside this range can be achieved by using transmitters made up from a larger number of elements or the use of mechanically steered arrays.

Alternatively single element, mechanically-steered transmitter arrays may be used for all movements of the guidance 'null'.

The edges of the acoustic beams are substantially parallel and the null 304 is ≈0.5 m in diameter.

The remote guidance system 400 operates in two principal stages: firstly, initial positioning of the acoustic beams 402A, 402B, 402C, 402D, and, secondly, control of the GUO 100 after launch. These two stages are described below.

The GUO 100 may be directed to a specific point as follows:

(i) the specific point is located by the main search sonar system 404, 406;

(ii) each of the transmitter arrays 402A, 402B, 402C, 402D is then switched on (together, or in turn depending upon the capability of processing means comprised in the remote guidance system 400) and the resulting insonified area is monitored using the main search sonar (each of the transmitter arrays 402A, 402B, 402C, 402D will use a differently coded transmission to that used by the search system enabling the acoustic beams 302A, 302B, 302C, 302D to be picked out separately);

(iii) each of the acoustic beams 302A, 302B, 302C, 302D is then adjusted in turn, by being moved towards the object towards which the GUO 100 is to be directed until a chosen highlight shows an acoustic return that is appropriate for the edge of the beam impinging directly on the target. By separately moving each of the acoustic beams to a position where the same return is obtained, the required central point of aim can be determined. An INS system is used to aid this process.

During the initial positioning phase the system acoustic guidance beams operate in a pulsed mode (in the same way as a standard active sonar transmitter) to aid accurate identification of the object to/towards which the GUO 100 is to be directed.

Figure 11:
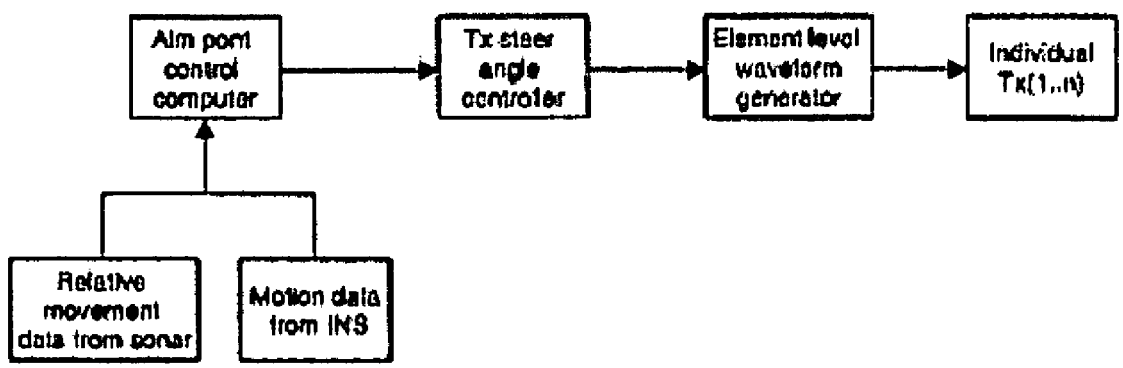
FIGS. 11 and 12 shows key steps in alignment of the FIG. 8 system.
Figure 12:
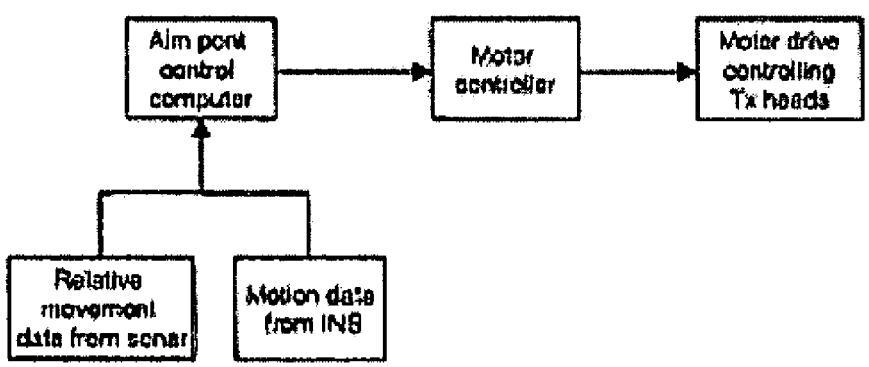
Figure 13:
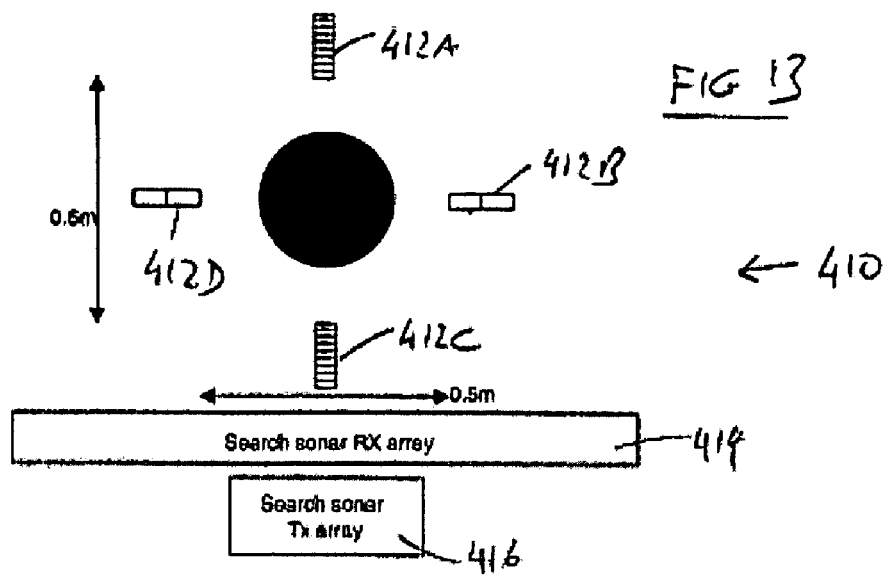
FIGS. 13 and 14 shows further remote guidance systems of the invention.
Figure 14:
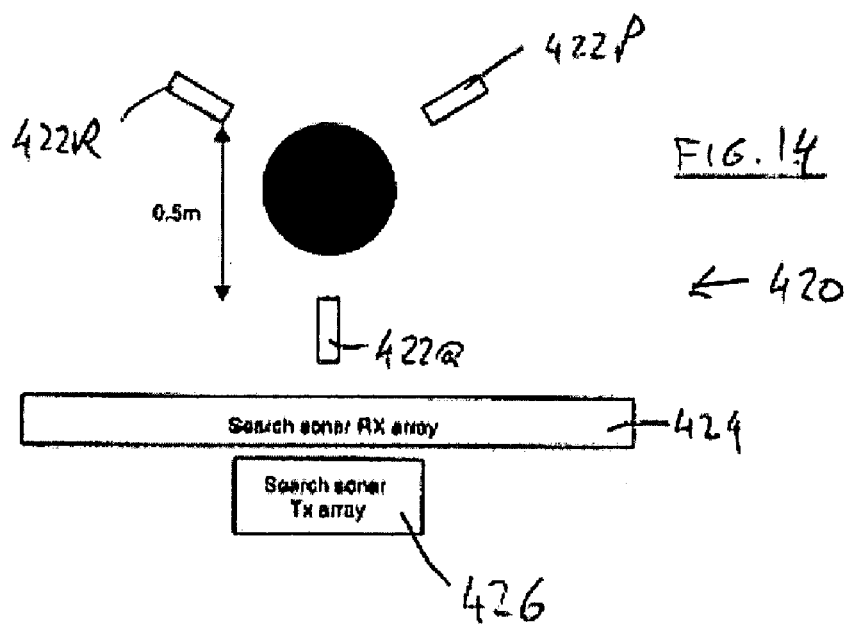

A schematic diagram showing key steps in the guidance process are shown in FIG. 11. Data from the INS and search sonar are passed to a control computer which controls steering of the transmitter arrays 402A, 402B, 402C, 402D and provides for the necessary waveforms to be passed to elements of the transmitter arrays 402A, 402B, 402C, 402D. FIG. 12 shows a similar process used where the system 400 has transmitter arrays which are mechanically-steered by a motor and a motor-controller.

Once the GUO 100 has been launched the remote guidance system 400 is operated as follows:

the transmitter arrays 402A, 402B, 402C, 402D will be switched to provide continuous transmission at their particular frequencies;

the transmitter arrays 402A, 402B, 402C, 402D are pointed so that the null 304 of the acoustic beams 302A, 302B, 302C, 302D is pointed directly at the object to, or towards which, the SPUO 100 is to be directed (this point of aim was previously created using the method described above);

during the flight time of the GUO 100 the acoustic beams 302A, 302B, 302C, 302D are adjusted to correct for motion of the remote guidance system 400, based upon INS and other sensor information.

The direction of the null 304 can be varied during the time of flight of the GUO 100. If required, the transmitter arrays 402A, 402B, 402C, 402D may be steered to a 'capture' direction (which is optimised to ensure that the vehicle is captured between the acoustic beams) at launch and then moved steadily back to the required alignment to ensure that the GUO 100 arrives at the required position.

In FIG. 8 a vehicle launch point is shown in the centre of the remote guidance system 400. This denotes an ideal situation, whereby the GUO 100 will be launched from within the null 304, maximising the probability of the guidance system 400 capturing the GUO 100. Other techniques are equally possible, whereby the GUO 100 is launched from a remote position and aimed towards an intercept point with the acoustic beams. The remote guidance system 400 will naturally draw the vehicle towards the null 304 as soon as acoustic signals are encountered. If problems are encountered in this area, then some broad (20°–30°) beams can be added outside beams 302A, 302B, 302C, 302D for the first 100 m of vehicle movement to ensure capture of the SPUO 100. (Reducing the number of elements in the transmitter arrays 402A, 402B, 402C, 402D will naturally broaden the acoustic beams 302A, 302B, 302C, 302D.)

FIG. 11 shows an alternative remote guidance system 410 comprising a series of line arrays 412A, 412B, 412C, 412D. Each array 412A, 412B, 412C, 412D creates a 3.44 degree by 24 degree beam, two (412A, 412C) of which are narrow in the vertical for up/down guidance and two (412B, 412D) of which are narrow in the horizontal for left/right guidance. Electronic or mechanical steering may also be used to control the direction flown by the vehicle. The use of 9 elements in the upper (412A) and lower (412C) arrays supports electronic beam steering though +/−12 degrees, whilst the use of two elements in the left and right hand arrays 412B, 412D supports left/right steering of +/−3.5 degrees. The system 410 is thus simpler than the system 400, as it uses only 22 individual transmitter elements, rather than the 72 used to produce conical control beams. Mechanical beam steering may also be used in the system 410, again resulting in use of simpler, single element, transmitters but more complex mechanical systems.

Another remote guidance system 420 is shown in FIG. 12 in which three line arrays 422P, 422Q, 422R are arranged with an angular spacing of 120°, with steering of the acoustic beams being achieved mechanically.

Although the GUO 100 is self-propelled, other embodiments of the invention may be non-self-propelled, e.g. an underwater projectile given an initial impulse at launch sufficient for the projectile to have a desired range but having no propulsion means.

The invention claimed is:

1. A remote guidance system for guiding an underwater abject having an on board guidance system and a hydrophone unit arranged to pass signals induced therein by an acoustic beam to the on-board guidance system to effect directional control, characterised by a plurality of transmitter arrays arranged to transmit a plurality of contiguous acoustic beams each having a different frequency or frequency chirp and enclosing null extending approximately in the direction of propagation of the acoustic beams and defining a flight path of the object.

2. A remote guidance system according to claim 1 wherein the hydrophone unit comprises an acoustically absorbing casing which is open at an end facing towards the rear of the object.

3. A remote guidance system according to claim 1 wherein said underwater object includes a plurality of bydrophone units each arranged to pass signals induced therein by an acoustic guiding beam to the on-board guidance system to effect directional control of the self-propelled underwater object, and wherein the on-board guidance system is arranged to distinguish signals induced by acoustic guidance beams having differing acoustic signal coding.

4. A remote guidance system according to claim 1 wherein the hydrophone unit further comprises a hydrodynamic fairing to prevent separation of fluid flow over the unit.

5. A remote guidance system according to claim 1 wherein the hydrophone unit is positioned along the length of the object so that the unit is substantially unaffected by any wake produced by the object when in motion.

6. A remote guidance system according to claim 1 wherein the transmitter arrays each comprise a two-dimensional array of individual elements arranged to transmit a conical acoustic beam.

7. A remote guidance system according to claim 6 comprising four transmitter arrays arranged to transmit four conical acoustic guiding beams.

8. A remote guidance system according to claim 1 wherein the transmitter arrays each comprise a one-dimensional line array of individual elements.

9. A remote guidance system according to claim 8 comprising four line-arrays.

10. A remote guidance system according to claim 1 further comprising a search sonar for locating an object to or towards which the self-propelled underwater object is to be directed.

* * * * *